United States Patent [19]
Tkhor et al.

[11] Patent Number: 5,943,447
[45] Date of Patent: Aug. 24, 1999

[54] VIDEO SIGNAL ENCODING/DECODING METHOD BASED ON ADAPTIVE LATTICE QUANTIZATION

[75] Inventors: Vadim B. Tkhor, Toronto, Canada; Euee-seon Jang, Sungnam; Jae-seob Shin, Seoul, both of Rep. of Korea

[73] Assignee: Samsung Electronics Co., Ltd., Suwon, Rep. of Korea

[21] Appl. No.: 08/933,976

[22] Filed: Sep. 19, 1997

[30] Foreign Application Priority Data

Sep. 21, 1996 [KR] Rep. of Korea ............. 96-41505

[51] Int. Cl.⁶ ............. G06K 9/36; G06K 9/38; G06K 9/46
[52] U.S. Cl. ............. 382/253; 382/233
[58] Field of Search ............. 382/253, 233; 348/422, 420, 414, 417, 418

[56] References Cited

U.S. PATENT DOCUMENTS 5,150,209 9/1992 Baker et al. ............. 358/133

OTHER PUBLICATIONS

J.H. Conway et al., "Fast Quantizing and Decoding Algorithms for Lattice Quantizers and Codes," IEEE Transactions on Information Theory, vol. IT–28, No. 2, Mar. 1982, pp. 227–232.

*Primary Examiner*—Phuoc Tran
*Attorney, Agent, or Firm*—Burns, Doane, Swecker & Mathis, L.L.P.

[57] ABSTRACT

A video signal encoding and/or decoding method based on adaptive lattice quantization. An input frame of a video sequence is partitioned into blocks of pixel data called vectors. The set of the vectors is partitioned into blocks called macroblocks. The vectors in each macroblock are subjected to lattice vector quantization which examines the range of vector components in multiple dimensions and adjusts the density of lattice vectors in accordance with the range of vector components. Quantization unit replaces each input vector for a nearest lattice vector in multidimensional space. Each quantized vector in the macroblock is converted into an index of a lattice vector. An overhead information about the range in a macroblock and set of indices with or without subsequent Huffman or Arithmetic coding is transmitted to or stored in the receiver end.

5 Claims, 2 Drawing Sheets

● — LATTICE POINT

▨ — SIGNAL POINT

／ — HYPERPLANE

VIDEO SIGNAL ENCODING/DECODING METHOD BASED ON ADAPTIVE LATTICE QUANTIZATION

BACKGROUND OF THE INVENTION

The present invention relates to a method for coding and/or decoding a video signal for digital storage media and transmission media.

A Lattice Vector Quantizer (LVQ) has been widely used in many systems of digital video signal bandwidth compression. A lattice is defined as a set of vectors A={x: x=U1× A1+U2×A2+. . . +UN×AN} where An (n=1, 2, . . . , N) are the basis vectors of the lattice and Un are integers. In a particular application, LVQ assumes truncation and scaling of the lattice and devising a method to quantize vectors that fall outside the truncated lattice. Truncation means selecting L lattice points x to be the output points Yi so that each source vector x is replaced by a nearest lattice point Yi.

The truncation and scaling is usually accomplished for a fixed number of lattice vectors L by trying various Euclidean distance scale factors on vectors generated from appropriate distributions and choosing the scale factor which minimizes the mean squared error. This distribution should be known prior to the encoding process. To know where to truncate the lattice for a given L lattice vectors, the number of lattice vectors in shells must be calculated at various radial distances from the origin of distribution. Such algorithms of calculation is known only for symmetrical distribution, like Gaussian or Laplacian distribution.

In practice, a real distribution of source vectors can be completely different. Incorrect truncation will always produce two well known distortions—overload quantization noise and granular quantization noise. The former is due to clipping the vectors outside the truncation border, the latter relates to rounding of vector components inside the truncation area. The problem is to find a balance between the two.

Another problem is that no algorithm exists for calculating L for any type of distribution. This means that by using the mentioned distributions instead of a real value, the LVQ will produce redundant number of lattice vectors L that increase the volume of code book and place a burden on system resources.

Usually, the conventional methods use fixed truncation and scaling procedures. On the other hand, a fixed LVQ should be able to simultaneously ensure a large range to quantize vectors with large norm or contrast and little distortion for vectors with low contrast. This contradictory demand is the main obstacle to improving the performance of conventional methods. Usually, attempts to increase compression by lowering L lead to fast decreasing of visual quality of a decoded video signal.

SUMMARY OF THE INVENTION

It is an object of the present invention to provide a method of coding a video signal which can ensure better reproduction of the video signal for the whole range of contrast with the same bit rate or the same quality of reproduction with a lower bit rate.

Another object of the present invention is to provide a method of decoding the thus-coded video signal.

To accomplish the first object of the present invention, there is provided a video signal coding method comprising the steps of:

partitioning each frame of an input video signal into vectors;

partitioning a set of vectors into macroblocks;

subjecting each vector in a macroblock to lattice vector quantization which examines the range of vector components in multiple dimensions and adjusts the density of lattice vectors in accordance with the range of vector components in the macroblock;

converting each quantized vector into an index of a lattice vector; and transmitting or storing overhead information about the range in the macroblock and set of indices.

To accomplish the second object of the present invention, there is provided a video signal decoding method comprising the steps of:

decoding overhead information about the range in a macroblock and set of indices;

converting each decoded index of lattice vector into a quantized vector; and restoring the value of quantized vector components in accordance with the range of vector components in a macroblock.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

The present invention will now be described in detail with reference to accompanying drawings.

It was found that the sensitivity of Human vision (HV) to quantization distortion changes from one part of an image to another. In the parts with large contrast or variance of a signal, the sensitivity decreases. However, in the smoothed parts with low variation, the sensitivity increases. Such decreasing of sensitivity is known as a masking effect. It is also known that this effect is local, that is, it is valid only in the vicinity of large changes in the video signal. At some distance from a part with a large variance in the signal, the sensitivity of HV returns to its highest level.

The local variance of a signal (that is, variance measured in a small block of pixels) also can vary significantly from block to block. Moreover, in a multidimensional case, the shape of local distribution of the video signal without transformation is far from Gaussian and Laplacian distribution.

It is also known that the parts of high variance (HVAR) of a signal and low sensitivity (LSENS) of HV (low variance (LVAR) of a signal and high sensitivity (HSENS) of HV) coincide in an image space. This means that the LVQ should be blockwise and its quantization step size should be scaled in direct proportion to variance (or some measure of activity) in the block. By choosing the proper scaling and size of macroblocks, we can ensure the following important conditions within each macroblock for improving the characteristics of LVQ, that is (HVAR & LSENS) or (LVAR & HSENS).

Based on this concept, in a video signal coding method according to the present invention, an input frame of a video sequence is partitioned into blocks of pixel data with or without transformation called vectors. The set of vectors is partitioned into blocks called macroblocks. The vectors in each macroblock are subjected to lattice vector quantization which examines the range of the vector components in multiple dimensions and adjusts the density of lattice vectors in accordance with the range of vector components. The quantization means replacing each input vector for the nearest lattice vector in multidimensional space. Each quantized vector in the macroblock is converted into an index of a lattice vector. Overhead information about the range in macroblock and set of indices with or without subsequent Huffman or Arithmetic coding is transmitted to or stored in the receiver end.

Figure 1:
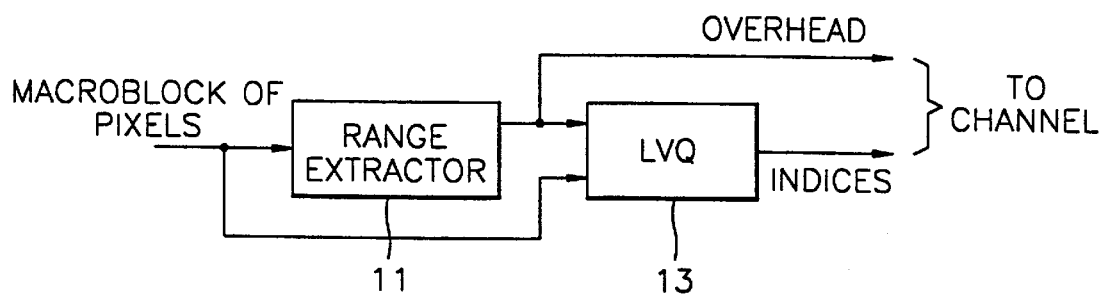
FIG. 1 is a block diagram of an adaptive LVQ encoder adopting a video signal coding method based on an adaptive lattice quantization according to the present invention.
Figure 3:
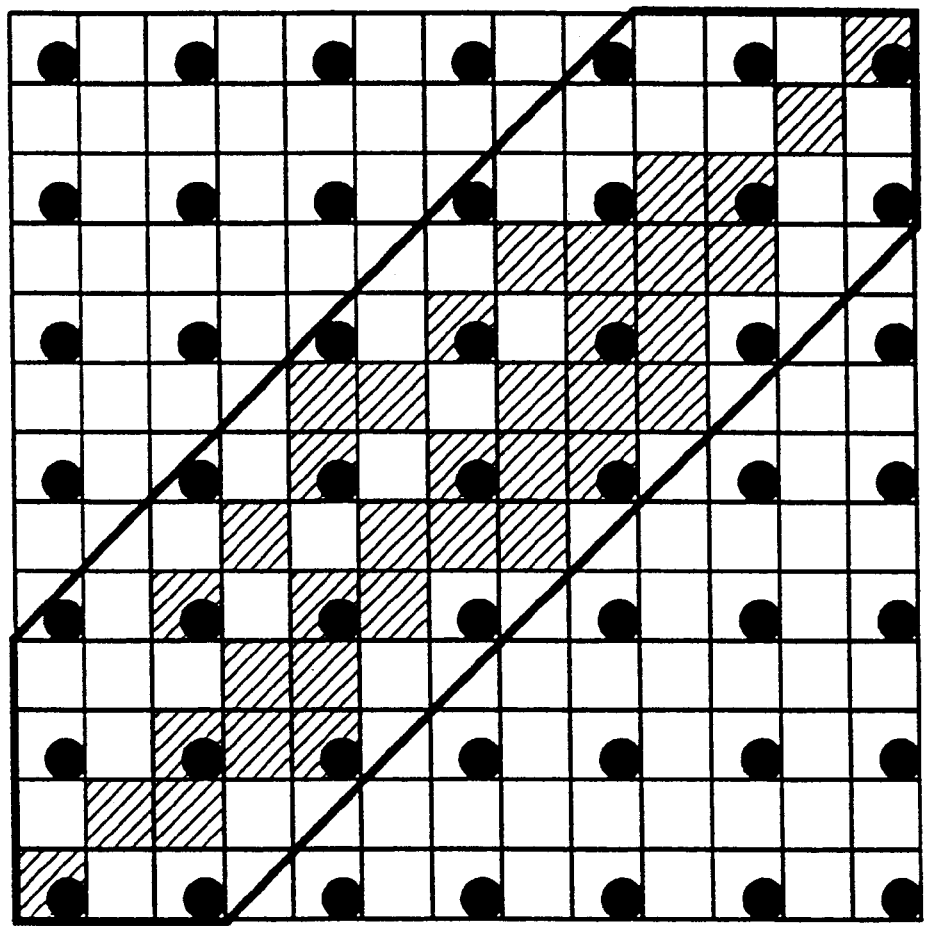
FIG. 3 shows an example of LVQ quantization for two dimensional case.

FIG. 1 shows an adaptive LVQ encoder 13 adopting a video signal coding method based on an adaptive lattice quantization according to the present invention. An input frame to the video signal encoder is first digitized and partitioned into spatially non-overlapping blocks of pixel data called vectors. The number of pixels in the vector can be different, but normally, 4, 8 or 16 pixels per vector are used. The set of vectors is partitioned into macroblocks. The size of the macroblocks should be an integer multiple of the vector size. Normally, a 16×16 or 32×32 macroblock size is used. Various criteria of vectors' range in multiple dimension can be used in range extractor. One of them used in the method proposed in the present invention is the difference between the maximum and minimum values of the vector components in the macroblock. For N-dimensional vector $X=(x1, x2, \ldots, xN)$, the vector of maximum values $Xmax=(xmax1, xmax2, \ldots, xmaxN)$ and that of minimum values $Xmin=(xmin1, xmin2, \ldots, xminN)$. These values are hyperplanes tangent to a set of vectors in a macroblock. As shown in FIG. 3, there can be more hyperplanes, for example, at an angle of 45° and with a dimension of 4, the transformation can be a simple rotation of the axis by 45°. In the presented method, the following transformation was found to be useful $F[0]=(1,1,1,1)$, $F[1]=(1, -1, -1, -1)$, $F[2]=(-1,1,1-1)$ $F[3]=(-1,-1,1,-)$, $F[4]=(-1,-1,-1,1)$. Each vector F[i] describes a certain hyperplane. The transformed source vector can be obtained by the simple operation $X^*=F[0]\times x[0]+F[1]\times x[1]+F[2]\times x[2]+F[3]\times x[3]$. The tangent hyperplanes at 45° are obtained by searching maximum and minimum values of the transformed vector components. For example, provided the vectors $X^*max=(x^*max1, x^*max2, \ldots, x^*maxN)$ and $X^*min=(x\ min1, x^*min2, \ldots, x^*minN)$, where N=5, more hyperplanes can be used to describe the range of vectors in multidimensional space. The convex body bordered by hyperplanes is a polyhedron. As shown in FIG. 3, using such hyperplanes, the lattice vectors which are always outside the hyperplanes can be easily determined. This allows the problem of lattice truncation to be solved. The above-described operation is performed by a range extractor 11 shown in FIG. 1.

As an overhead, only a rectangular set of range vectors is used. Other vectors are used only in the truncation procedure. That is each quantized component of a vector should be checked if it is within the specified range, that is, the conditions $X^*\epsilon$ (x mini, x*maxi), xi$\epsilon$ (xmini, xmaxi) and i=1, ..., N should be satisfied. If the results of quantization do not meet this restriction, the search of other lattice vector to represent a current vector is initiated. Here, any conventional search strategy can be used.

The aforementioned set of vectors constitute the overhead information sent once per macroblock. For example, for a macroblock of 32×32 pixels and an 8-bit decision for representing the 4-dimensional vector components, we have 64 (=4×8+4×8) bits, that is, 0.0625 (=64/1024) bits/pixel. Increasing the dimension leads to a linear increase in the overhead as opposed to such quantizer as LBG where the overhead increases exponentially.

In principle, a LVQ can construct any existing lattice, but in practice, simple Zn and Dn lattices are sufficient for use in the LVQ. To obtain Zn, we have to use scalar quantizers for each dimension. The Zn lattice will be a product of the scalar code books. The Dn lattice is derived from the Zn lattice vectors with a sum of the components.

In FIG. 1, the vector of quantization steps for each dimension is obtained by the LVQ 13. The number of quantization levels is fixed and only the step is adjusted to the current range of macroblocks. The vector of steps $S=(s1, s2, \ldots, sQ)$ can be obtained as $si=(xmaxi-xmini)/Q$, where Q is a specified level. With respect to all kinds of component value rounding can be performed. For example, there is a well-known procedure described by J. H. Convay and J. A. Sloan in "Fast Quantizing and Decoding Algorithms for Lattice Quantizers and Codes", IEEE Transactions on Information Theory, Vol. IT-28, No. 2, March 1982.

The thus-obtained indices and overhead information can be subjected to a Huffman or Arithmetic coding procedure to remove statistical redundancy.

Figure 2:
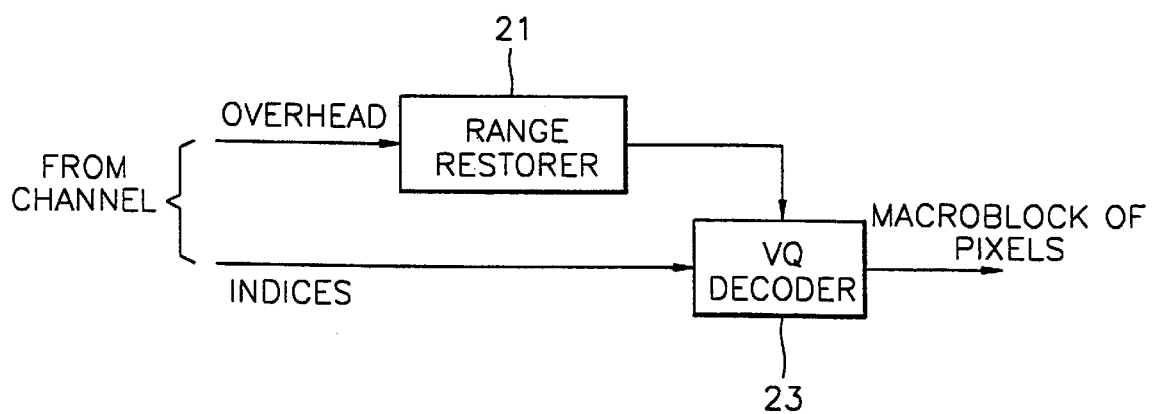
FIG. 2 is a block diagram of a video signal decoder adopting a video signal decoding method based on an adaptive lattice quantization according to the present invention.

On a decoder presented in FIG. 2, the inverse operation of the encoder of FIG. 1 is performed. If statistical encoding is used, a Huffman or Arithmetic decoding procedure is performed to restore values of indices and overhead vector components. In a range restorer 21, conversion of an index to quantized vector components and restoration of their real values are performed by multiplying the quantized components and step vector components. For example, if $I=(I1, I2, \ldots, IN)$ and $S=(s1, s2, \ldots, sN)$ is quantized and step vectors, correspondingly, then restored vector $XR=(xr1, xr2, \ldots, xrN)$ is obtained by $xri=Iixsi$, $Ii=1, 2, \ldots, N$.

As described above, according to the present invention, a video signal encoding and/or decoding method based on an adaptive lattice quantization can ensure better reproduction of a video signal for the whole range of contrast with the same bit rate or the same quality of reproduction with a lower bit rate.

What is claimed is:

1. A video signal encoding method based on adaptive lattice quantization comprising the steps of:

partitioning each frame of an input video signal into vectors;

partitioning a set of vectors into macroblocks;

subjecting each vector in a macroblock to lattice vector quantization which examines the range of vector components in multiple dimensions and adjusts the density of lattice vectors in accordance with the range of vector components in the macroblock;

converting each quantized vector into an index of a lattice vector; and transmitting or storing overhead information about the range in the macroblock and set of indices.

2. A video signal decoding method based on adaptive lattice quantization comprising the steps of:

decoding overhead information about the range in a macroblock and set of indices;

converting each decoded index of lattice vector into a quantized vector; and restoring the value of quantized vector components in accordance with the range of vector components in a macroblock.

3. A video signal encoding and/or decoding method based on adaptive lattice quantization comprising the steps of:

partitioning each frame of an input video signal into vectors;

partitioning a set of vectors into macroblocks;

subjecting each vector in a macroblock to lattice vector quantization which examines the range of vector components in multiple dimensions and adjusts the density of lattice vectors in accordance with the range of vector components in the macroblock;

converting each quantized vector into an index of a lattice vector;

transmitting or storing overhead information about the range in the macroblock and set of indices;

decoding overhead information about the range in a macroblock and set of indices;

converting each decoded index of lattice vector into a quantized vector; and restoring the value of quantized vector components in accordance with the range of vector components in a macroblock.

4. A video signal encoding apparatus for encoding video signals based on adaptive lattice quantization comprising:

means for partitioning each frame of an input video signal into vectors;

means for partitioning a set of vectors into macroblocks and for converting each quantized vector into an index of a lattice vector; and means for subjecting each vector in a macroblock to lattice vector quantization which examines the range of vector components in multiple dimensions and adjusts the density of lattice vectors in accordance with the range of vector components in the macroblock, and transmitting or storing overhead information about the range in the macroblock and set of indices.

5. A video signal decoding apparatus for decoding video signals based on adaptive lattice quantization comprising the steps of:

means for decoding overhead information about the range in a macroblock and set of indices; and means for converting each decoded index of lattice vector into a quantized vector, and for restoring the value of quantized vector components in accordance with the range of vector components in a macroblock.

* * * * *